(12) United States Patent
Zeng

(10) Patent No.: US 12,084,105 B2
(45) Date of Patent: Sep. 10, 2024

(54) WHEEL MECHANISM AND CHILD CARRIER

(71) Applicant: WONDERLAND SWITZERLAND AG, Steinhausen (CH)

(72) Inventor: Haibo Zeng, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 154 days.

(21) Appl. No.: 17/586,380

(22) Filed: Jan. 27, 2022

(65) Prior Publication Data

US 2022/0234643 A1 Jul. 28, 2022

(30) Foreign Application Priority Data

Jan. 28, 2021 (CN) .......................... 202110120312.6

(51) Int. Cl.
*B62B 9/12* (2006.01)
(52) U.S. Cl.
CPC ............ *B62B 9/12* (2013.01); *B62B 2301/05* (2013.01); *B62B 2301/20* (2013.01)
(58) Field of Classification Search
CPC ... B62B 9/12; B62B 2301/05; B62B 2301/20; B62B 2205/104; B62B 2301/0463;
(Continued)

(56) References Cited

U.S. PATENT DOCUMENTS

| 5,800,023 A * | 9/1998 | Hartenstine | B60B 37/10 |
| | | | 280/654 |
| 7,506,890 B2 * | 3/2009 | Chen | B62B 9/00 |
| | | | 280/47.38 |

(Continued)

FOREIGN PATENT DOCUMENTS

| CN | 2530859 Y | 1/2003 |
| CN | 2848603 Y * | 12/2006 |

(Continued)

OTHER PUBLICATIONS

Translated copy of CN-201816629-U (Year: 2024).*

(Continued)

*Primary Examiner* — James A Shriver, II
*Assistant Examiner* — Ian Bryce Shelton
(74) *Attorney, Agent, or Firm* — HAUPTMAN HAM, LLP

(57) ABSTRACT

The present disclosure relates to a wheel mechanism and a child carrier. The wheel mechanism includes a wheel quick-release mechanism and/or a wheel orientation mechanism. The wheel quick-release mechanism detachably installs the wheel seat onto the frame, and includes a connecting rod having an end connected with the frame and the other end provided with a snapping portion; a receiving hole arranged in the wheel seat for receiving the connecting rod; an inserting channel arranged in the wheel seat and communicated with the receiving hole; an operating member movably arranged in the inserting channel; and a spring. The wheel orientation mechanism orients a wheel seat with respect to a frame and includes an orientating portion on the frame; a receiving slot arranged in the wheel seat corresponding to the orientating portion; and an oriented-locking element interposed into the receiving slot and sliding between a released position and a locked position.

13 Claims, 10 Drawing Sheets

(58) Field of Classification Search
CPC ..... B62B 9/00; B60B 33/001; B60B 33/0021; B60B 33/00
See application file for complete search history.

(56) References Cited

U.S. PATENT DOCUMENTS

| | | | | |
|---|---|---|---|---|
| 9,120,350 | B2* | 9/2015 | Zeng | B60B 33/023 |
| 10,479,141 | B2* | 11/2019 | Bastien | B60B 3/145 |
| 2007/0210544 | A1* | 9/2007 | Chen | B60B 33/001 |
| | | | | 280/47.34 |
| 2011/0049967 | A1* | 3/2011 | Cheng | B60B 33/0002 |
| | | | | 301/111.06 |
| 2019/0255882 | A1* | 8/2019 | Bastien | B60B 33/045 |
| 2023/0059506 | A1* | 2/2023 | Wu | B60B 33/025 |
| 2023/0226852 | A1* | 7/2023 | Cioroiu | B60B 35/004 |
| | | | | 301/1 |

FOREIGN PATENT DOCUMENTS

| | | | | |
|---|---|---|---|---|
| CN | 201183514 | Y | | 1/2009 |
| CN | 201261488 | Y | | 6/2009 |
| CN | 201350916 | Y | | 11/2009 |
| CN | 201745633 | U | * | 2/2011 |
| CN | 201816629 | U | * | 5/2011 |
| CN | 201856795 | U | | 6/2011 |
| CN | 202130472 | U | | 2/2012 |
| CN | 103029739 | A | | 4/2013 |
| CN | 202879564 | U | | 4/2013 |
| CN | 203651859 | U | | 6/2014 |
| CN | 104057994 | A | * | 9/2014 | ........... B60B 33/023 |
| CN | 204586979 | U | | 8/2015 |
| CN | 205186249 | U | * | 4/2016 |
| CN | 104057994 | B | | 8/2016 |
| CN | 207955759 | U | | 10/2018 |
| CN | 208963152 | U | | 6/2019 |
| CN | 111731039 | A | * | 10/2020 |
| CN | 112455526 | A | | 3/2021 |
| EP | 2740655 | A1 | | 6/2014 |
| GB | 2432308 | A | * | 5/2007 | ............. B60B 1/006 |

OTHER PUBLICATIONS

Taiwan Office Action issued in corresponding Taiwan Application No. 111146460, dated Jun. 29, 2023, pp. 1-4.
Chinese Search Report issued in corresponding Chinese Application No. 202110120312.6, dated Sep. 27, 2021, pp. 1-26.
Taiwan Office Action issued in corresponding Taiwan Application No. 111103991, dated Aug. 2, 2022, pp. 1-5.

* cited by examiner

WHEEL MECHANISM AND CHILD CARRIER

CROSS-REFERENCE TO RELATED APPLICATIONS

The present application is based on and claims the benefit of and priority to Chinese Patent Application No. 202110120312.6, filed on Jan. 28, 2021, the entire contents of which being incorporated herein by reference.

TECHNICAL FIELD

The present disclosure relates to a wheel mechanism including a wheel quick-release mechanism and/or a wheel orientation mechanism, in particular to a wheel mechanism for a child carrier, and more particularly to a wheel mechanism for front wheels of a child carrier. The present disclosure also relates to a child carrier with the wheel mechanism.

BACKGROUND

With the continuous development of economy and society, there is an increasing attention for children's health and comfort. In order to take better care of children, a variety of child carriers have been developed, such as strollers, baby carriages, cribs on wheels, and the like. In order to reduce the packaging volume and save the packaging and transportation cost, wheels of the existing child carriers are usually separated from a carrier body or a frame when the child carriers leave the factory, and need to be installed by users. Moreover, in order to avoid occupying too much stored space, it is also necessary to disassemble unused child carriers and store them in a storage room to save the storage volume. However, disassembling and assembling structures usually used for the wheels of the existing child carriers are complicated, and need to be operated with greater efforts or even by several operators to cooperate for disassembly or assembly, which is unfavorable to the disassembling and assembling operations of the wheels and causes inconveniences for the users of child carriers, especially for the users who have less strength. Sometimes, the small parts after disassembly may be lost, which affects the subsequent use of child carriers. In addition, the complicated disassembling and assembling structure is unfavorable not only to manufacture child carriers and assemble child carriers during the manufacturing process, but also to control the cost.

Therefore, there is a need for a wheel quick-release structure, which can easily and quickly disassemble and assemble wheels and is simple to operate, can prevent its parts from being scattered and lost, is convenient to manufacture and assemble, improves the production efficiency, and saves the production cost.

During the moving process of the child carrier, the wheels, especially the front wheels, are easily influenced by the road surface and may arbitrarily turn, which makes it difficult for users to operate. Therefore, in the case of keeping the child carrier moving forwards in a straight line, it is necessary to orient the wheels, especially the front wheels, so that the child carrier may keep moving forwards in a straight line, thereby avoiding the user from being distracted by the manipulation of direction of the child carrier when taking care of a child. On the existing child carrier, a wheel orientation mechanism has a complicated structure and is inconvenient to operate, which is not favorable for the user to focus on taking care of the child. In addition, its complicated structure is not favorable to manufacture the child carriers and assemble the child carriers during the manufacturing process, thereby virtually reducing the production efficiency and increasing the manufacturing cost.

Therefore, there is a need for such a wheel orientation structure that can easily and quickly orient the wheels, is simple and convenient to operate, is convenient to manufacture and assemble, improves the production efficiency, and saves the production cost.

SUMMARY

An objective of the present disclosure is to provide a wheel quick-release structure, which can easily and quickly disassemble and assemble wheels and is simple to operate, thereby at least solving one of the above-mentioned problems existing in the prior art.

Another objective of the present disclosure is to provide a wheel quick-release structure, which can prevent its parts from being scattered and lost during disassembly, thereby at least solving one of the above-mentioned problems existing in the prior art.

Another objective of the present disclosure is to provide a wheel quick-release structure, which is convenient to manufacture and assemble, improves the production efficiency and saves the manufacturing cost, thereby at least solving one of the above-mentioned problems existing in the prior art.

Another objective of the present disclosure is to provide a wheel orientation structure, which can easily and quickly orient wheels, and is simple and convenient to operate, thereby at least solving one of the above-mentioned problems existing in the prior art.

Another objective of the present disclosure is to provide a wheel orientation structure, which can easily and quickly orient wheels, is convenient to manufacture and assemble, improves the production efficiency, and saves the production cost, thereby at least solving one of the above-mentioned problems existing in the prior art.

Another objective of the present disclosure is to provide a wheel mechanism including a wheel quick-release mechanism and/or a wheel orientation mechanism, thereby solving at least one of the above-mentioned problems existing in the prior art.

In order to achieve at least one of the above objectives, the present disclosure provides a wheel mechanism including a wheel quick-release mechanism for detachably installing a wheel seat onto a frame. The wheel quick-release mechanism includes a connecting rod having an end connected with the frame and the other end provided with a snapping portion; a receiving hole arranged in the wheel seat for receiving the connecting rod; an inserting channel arranged in the wheel seat and communicated with the receiving hole; and an operating member movably arranged in the inserting channel and having an operating hole and an elastic abutting portion, wherein the connecting rod penetrates through the operating hole synchronously when received in the receiving hole, and the elastic abutting portion is capable of snapping with and abutting against the inserting channel, the operating member has a locked position in a normal state and a released position in a state under an external force, and in the locked position, the operating member restricts the connecting rod from being disengaged from the receiving hole, and in the released position, the operating member allows the connecting rod to be disengaged from the receiving hole; and a spring acting between the operating member and the wheel seat, and applying an elastic force on the operating member to keep the operating member in the locked position, wherein the elastic abutting portion of the operating member is elastically deformed in a direction transverse to an inserting direction of the operating member, and has a transverse dimension larger than an inlet size of the inserting channel in the normal state, so that the elastic abutting portion is elastically deformed when the operating member enters an inlet of the inserting channel, and is elastically returned when the operating member is inserted into an appropriate position of the inserting channel, and cannot be disengaged from the inserting channel.

Preferably, the operating member also has a clamping portion body, and the elastic abutting portion extends from the clamping portion body, so that the elastic abutting portion is elastically deformed when the operating member enters the inlet of the inserting channel, and is elastically returned after the operating member is inserted into the appropriate position of the inserting channel.

Preferably, the elastic abutting portion is provided as an elastic finger, and the elastic finger obliquely extends from an inserting end of the clamping portion body or a position of the clamping portion body near the inserting end in a direction opposite to the inserting direction to form a branched arm, and is elastically deformed when the operating member enters the inlet of the inserting channel, and is elastically returned after the operating member is inserted into the appropriate position of the inserting channel.

Preferably, a plurality of elastic fingers are provided, and are distributed circumferentially around the clamping portion body.

Preferably, two elastic fingers are provided, the clamping portion body is in a shape of flat plate, the operating hole is positioned at a central position of the clamping portion body, and the two elastic fingers respectively extend from opposite sides of the clamping portion body with respect to the inserting direction.

Preferably, the elastic abutting portion is provided as an elastic skirt, and the elastic skirt obliquely extends from an inserting end of the clamping portion body or a position of the clamping portion body near the inserting end in a direction opposite to the inserting direction to form a mushroom shape, the elastic skirt is elastically deformed when the operating member enters the inlet of the inserting channel, and is elastically returned after the operating member is inserted into the appropriate position of the inserting channel.

Preferably, the operating member has an integrally formed clamping portion and an operating portion for inserting operation, the operating hole and the elastic abutting portion are arranged on the clamping portion, an end of the spring is installed on the operating portion, and the other end of the spring is installed at a corresponding position of the wheel seat.

Preferably, the operating hole is in a gourd shape with a large hole portion and a small hole portion that communicates with each other. Shapes and sizes of the large hole portion and the small hole portion are provided to match with a shape and size of the snapping portion of the connecting rod, so that when the connecting rod is received in an interposing direction of the receiving hole, the snapping portion of the connecting rod may pass through the large hole portion, but cannot pass through the small hole portion, and the connecting rod may move between the large hole portion and the small hole portion in a direction transverse to the interposing direction.

Preferably, the snapping portion includes a tail head portion formed at a tail end of the connecting rod, and a fixing recess portion provided at a side of the tail head portion away from the tail end, and is formed as a groove that is recessed inward in an entire circumference. In the locked position, the fixing recess portion is aligned with the small hole portion, and is snapped (engaged) with the small hole portion of the operating hole via the tail head portion; and in the released position, the fixing recess portion is aligned with the large hole portion, and the tail head portion may pass through the large hole portion.

Preferably, a step portion is formed between the clamping portion and the operating portion, and the spring is positioned between the step portion and a corresponding position of the wheel seat. When an external force along the inserting direction is applied to the operating member so that the operating member is in the released position, the spring contracts; and when the operating member is released, a contraction force of the spring forces the operating member to return to the locked position.

The present disclosure also provides a wheel assembly including the wheel quick-release mechanism, the wheel seat and the wheel as described above, and the wheel may be rotatably installed on the wheel seat.

Preferably, the wheel is a front wheel.

The present disclosure also provides a child carrier including a frame and at least one wheel assembly as described above.

In order to achieve at least one of the above objectives, the present disclosure provides a wheel mechanism. The wheel mechanism includes a wheel orientation mechanism for orienting a wheel seat with respect to a frame. The wheel orientation mechanism includes: an orientating portion arranged on the frame; a receiving slot arranged in the wheel seat corresponding to the orientating portion; an oriented-locking element, wherein the oriented-locking element includes an elastic stopping portion and an engaging end, is interposed into the receiving slot and is capable of sliding between a released position and a locked position relative to the orientating portion under an external force; when the oriented-locking element is in the locked position, the engaging end of the oriented-locking element protrudes from an opening of the receiving slot and is inserted into the orientating portion; and when the oriented-locking element is in the released position, the engaging end of the oriented-locking element is retracted into the receiving slot and is not inserted into the orientating portion. The oriented-locking element is elastically deformed in a direction transverse to a plugging direction thereof, and has a transverse dimension larger than an inlet size of the receiving slot in a normal state, so that the oriented-locking element is elastically deformed when it enters the inlet of the receiving slot, and is elastically returned when the oriented-locking element is inserted into an appropriate position of the receiving slot and cannot be disengaged from the receiving slot.

Preferably, the receiving slot has a locking slot near the inlet and a release slot far away from the inlet, there is a locking protrusion protruding inward between the locking slot and the release slot, an opening size formed by the locking protrusion is smaller than the transverse dimension of the oriented-locking element in the normal state. In the released position, the elastic stopping portion is in the release slot; and in the locked position, the elastic stopping portion is in the locking slot.

Preferably, both sides of a top end of the locking protrusion are side walls that smoothly incline outwards respectively, so that the elastic stopping portion may move between the release slot and the locking slot cross the locking protrusion under the external force, so as to be stopped in the locking slot or the release slot.

Preferably, the locking slot has a step portion at an end thereof near the opening of the elastic stopping portion, when the oriented-locking element reaches the locked position under the external force, the step portion blocks the elastic stopping portion to prevent the oriented-locking element from being removed out from the receiving slot, and the elastic stopping portion is in the locking slot, and is stopped in the locking slot in a pose of a certain degree of deformation by a force exerted by a side wall of the locking protrusion near the locking slot.

Preferably, the oriented-locking element also includes a sliding portion, and the elastic stopping portion is positioned between the engaging end and the sliding portion. The locking slot has a guide portion arranged at an end of the locking slot opposite to the inlet. When the elastic stopping portion moves between the release slot and the locking slot, the sliding portion slides on the guide portion.

Preferably, a guide rod is arranged in the receiving slot, the guide rod extends from a bottom center of the receiving slot towards the inlet and forms an annular space with an inner wall of the receiving slot. The oriented-locking element has a guide hole arranged in a center of an interposing end of the oriented-locking element, and when the oriented-locking element is interposed into the locking slot, the guide rod penetrates into the guide hole.

Preferably, the oriented-locking element also includes a handle exposed outside for the user to pull or press, so as to control movement of the oriented-locking element.

Preferably, the oriented-locking element also includes an oriented-locking element body, and the elastic stopping portion extends out of the oriented-locking element body, so that the elastic stopping portion is elastically deformed when the oriented-locking element enters the inlet of the receiving slot, and is elastically returned when the oriented-locking element is inserted into the appropriate position of the receiving slot.

Preferably, the elastic stopping portion is provided as a finger, and the finger obliquely extends from an interposing end of the oriented-locking element body or a position of the oriented-locking element body near the interposing end in a direction opposite to the plugging direction to form a branched arm, the elastic finger is elastically deformed when the oriented-locking element enters the inlet of the receiving slot, and is elastically returned after the oriented-locking element is inserted into the appropriate position of the receiving slot.

Preferably, a plurality of fingers are provided, and are distributed uniformly circumferentially around the oriented-locking element body.

Preferably, two fingers are provided, and the oriented-locking element body is in a shape of flat plate or cylindrical rod, and the two fingers respectively extend from two opposite sides of the oriented-locking element body transverse to the plugging direction.

Preferably, the elastic stopping portion is provided as a skirt, and the skirt obliquely extends from an interposing end of the oriented-locking element body or a position of the oriented-locking element body near the interposing end in a direction opposite to the plugging direction to form a mushroom shape, and the skirt is elastically deformed when the oriented-locking element enters the inlet of the receiving slot, and is elastically returned after the oriented-locking element is inserted into the appropriate position of the receiving slot.

The disclosure also provides a wheel assembly including a wheel orientation mechanism, the wheel seat and the wheel, and the wheel may be rotatably installed on the wheel seat.

Preferably, the wheel is a front wheel.

The present disclosure also provides a child carrier including a frame and the wheel assembly as described above.

The present disclosure also provides a wheel assembly including: a wheel mechanism including the wheel quick-release mechanism as described above and/or a wheel mechanism including a wheel orientation mechanism as described above; a wheel seat; and a wheel. The wheel is rotatably installed on the wheel seat.

Preferably, the wheel is a front wheel.

The present disclosure also provides a child carrier including a frame and at least one wheel assembly as described above.

The wheel quick-release structure of the present disclosure has the following beneficial technical effects: the wheel quick-release structure can easily and quickly disassemble and assemble wheels and is simple to operate, can prevent its parts from being scattered and lost, is convenient to manufacture and assemble, improves the production efficiency and saves the production cost.

The wheel orientation structure of the present disclosure has the following beneficial technical effects: the wheel orientation structure can easily and quickly orient wheels, is simple and convenient to operate, is convenient to manufacture and assemble, improves the production efficiency, and saves the production cost.

The wheel mechanism of the present disclosure has one or all of the above-mentioned beneficial technical effects.

BRIEF DESCRIPTION OF THE DRAWINGS

Various objectives, features and advantages of the present disclosure will become more apparent by considering the following detailed description of the preferred embodiments of the present disclosure in conjunction with the accompanying drawings. The drawings are only exemplary illustrations of the present disclosure and are not necessarily drawn to scale. In the drawings, the same reference numbers always refer to the same or similar components.

LIST OF REFERENCE NUMBERS

1—wheel seat
11—receiving hole
12—operating member
121—clamping portion
1211—operating hole
1218—small hole portion
1219—large hole portion
1212—elastic abutting portion
1213—clamping portion body
122—operating portion
123—step portion
13—spring
14—blocking portion
15—inserting channel
151—small-sized channel portion
152—large-sized channel portion
17—guide rod
18—receiving slot
181—locking slot
182—release slot
183—locking protrusion
184—step portion
185—guide portion
19—oriented-locking element
191—elastic stopping portion
192—engaging end
193—sliding portion
194—guide hole
198—oriented-locking element body
2—frame
21—connecting rod
211—snapping portion
2111—fixing recess
2112—tail head portion
22—connecting portion
229—orientating portion
3—wheel
C—interposing direction
D—inserting direction
M—transverse dimension of elastic abutting portion
N—inlet size of inserting channel
O—opening size
P—inlet size of receiving slot
Q—transverse dimension of oriented-locking element
X—plugging direction

DETAILED DESCRIPTION

Hereinafter, exemplary embodiments of the present disclosure will be described in detail with reference to the accompanying drawings. Although the present disclosure is susceptible to various modifications and alternative forms, specific embodiments thereof are shown by way of example in the accompanying drawings. However, the present disclosure should not be construed as being limited to the embodiments set forth herein; on the contrary, it will cover all modifications, equivalents and alternatives falling within the spirit and scope of the present disclosure.

The present disclosure will be described in detail below with reference to the accompanying drawings.

Figure 1:
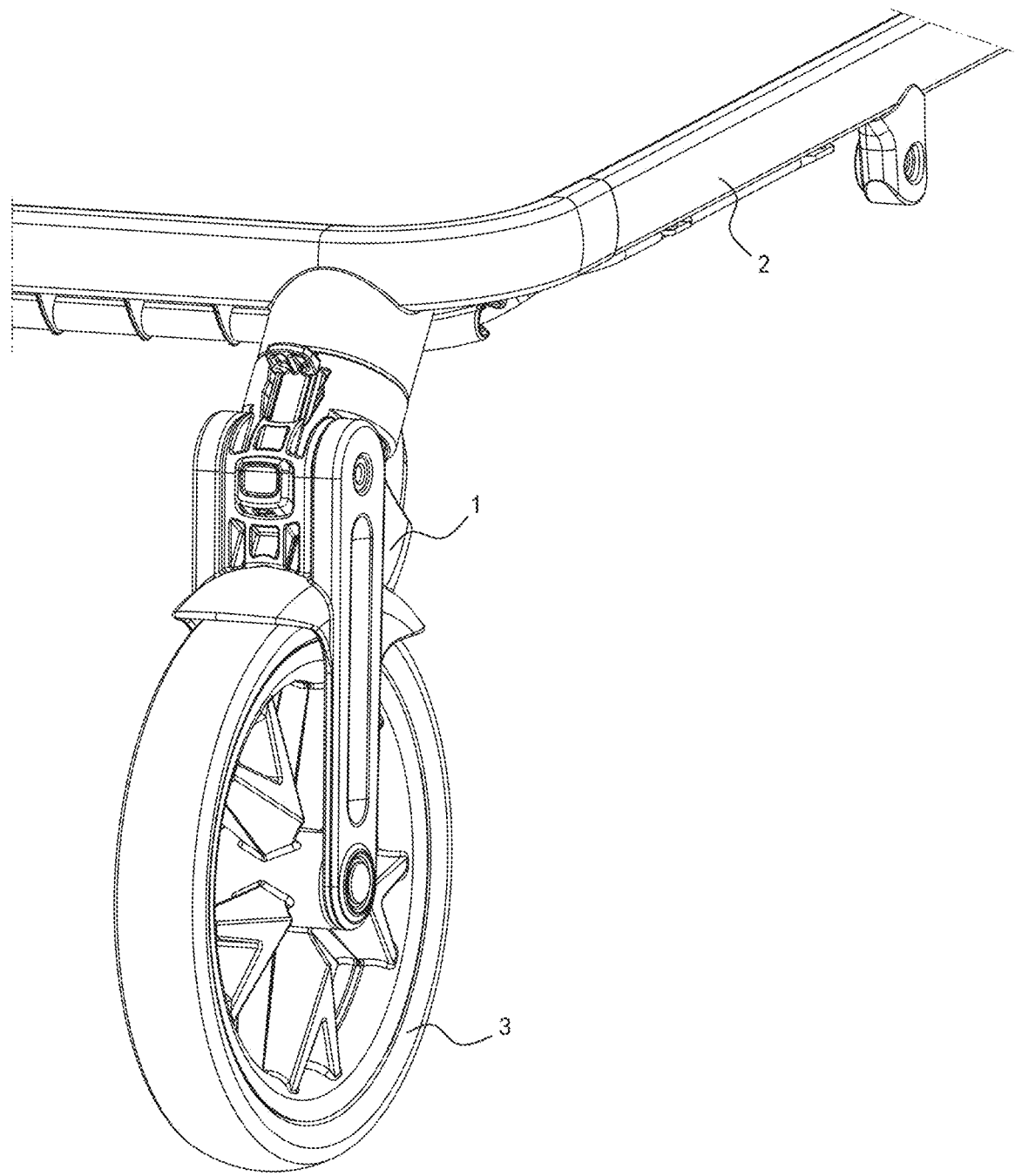
FIG. 1 shows a perspective view of a wheel assembly and a part of a frame connected thereto according to an embodiment of the present disclosure.
Figure 2:
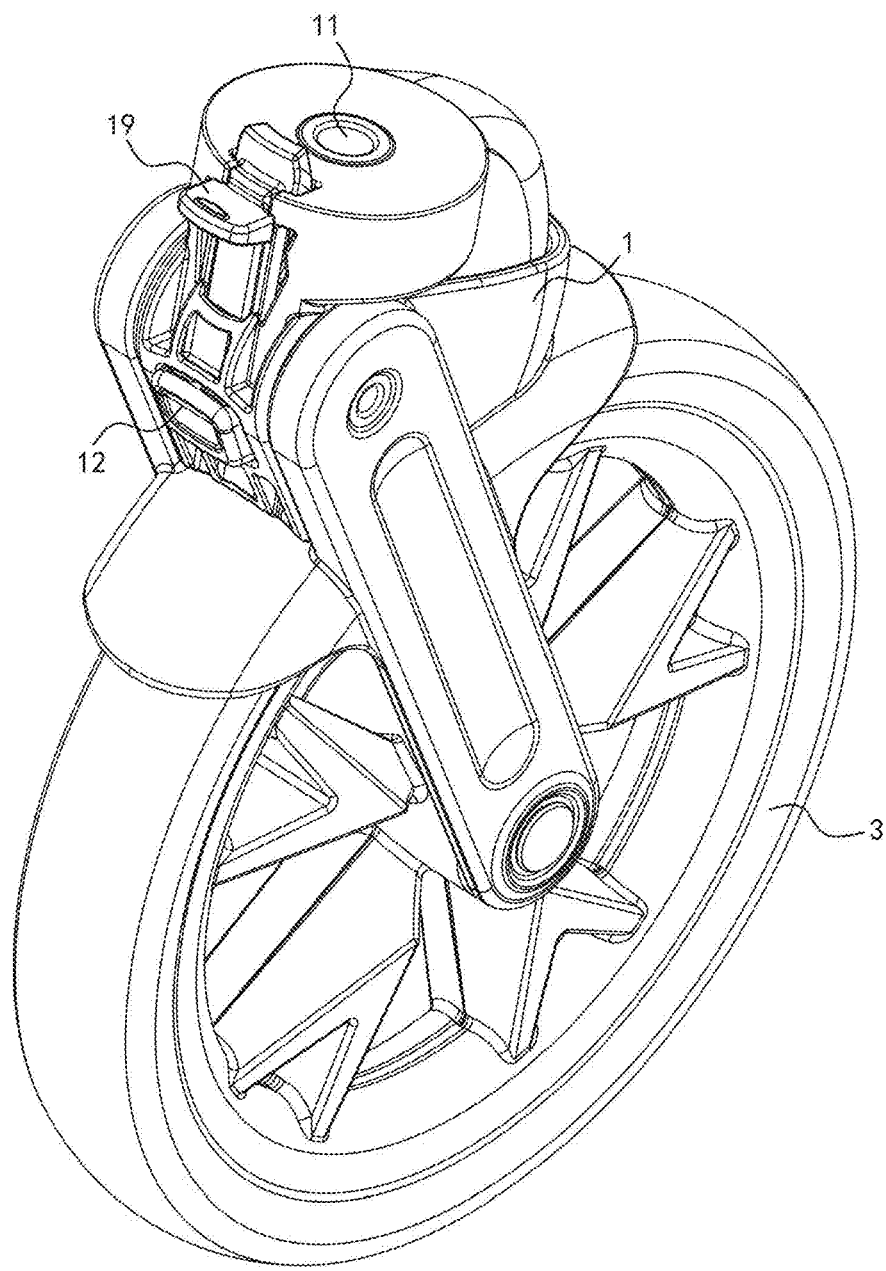
FIG. 2 shows a perspective view of a wheel assembly according to an embodiment of the present disclosure.
Figure 3:
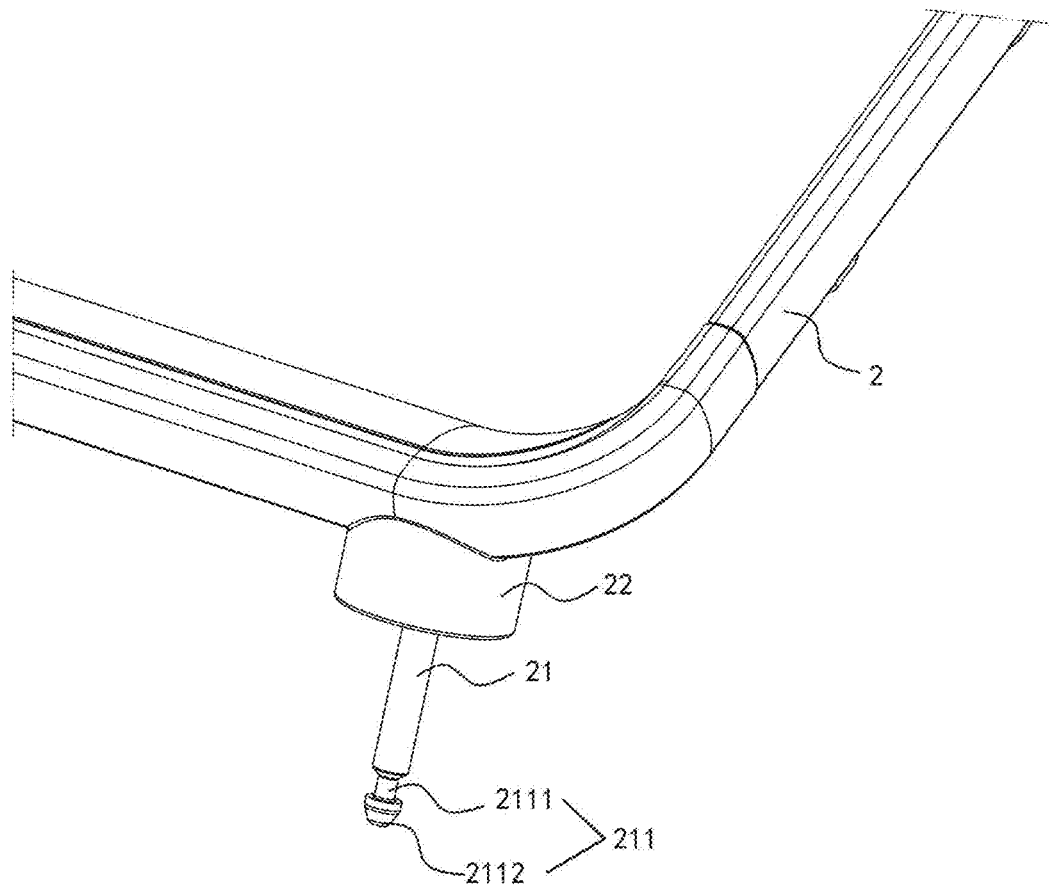
FIG. 3 shows a perspective view of a part of a frame according to an embodiment of the present disclosure.
Figure 4:
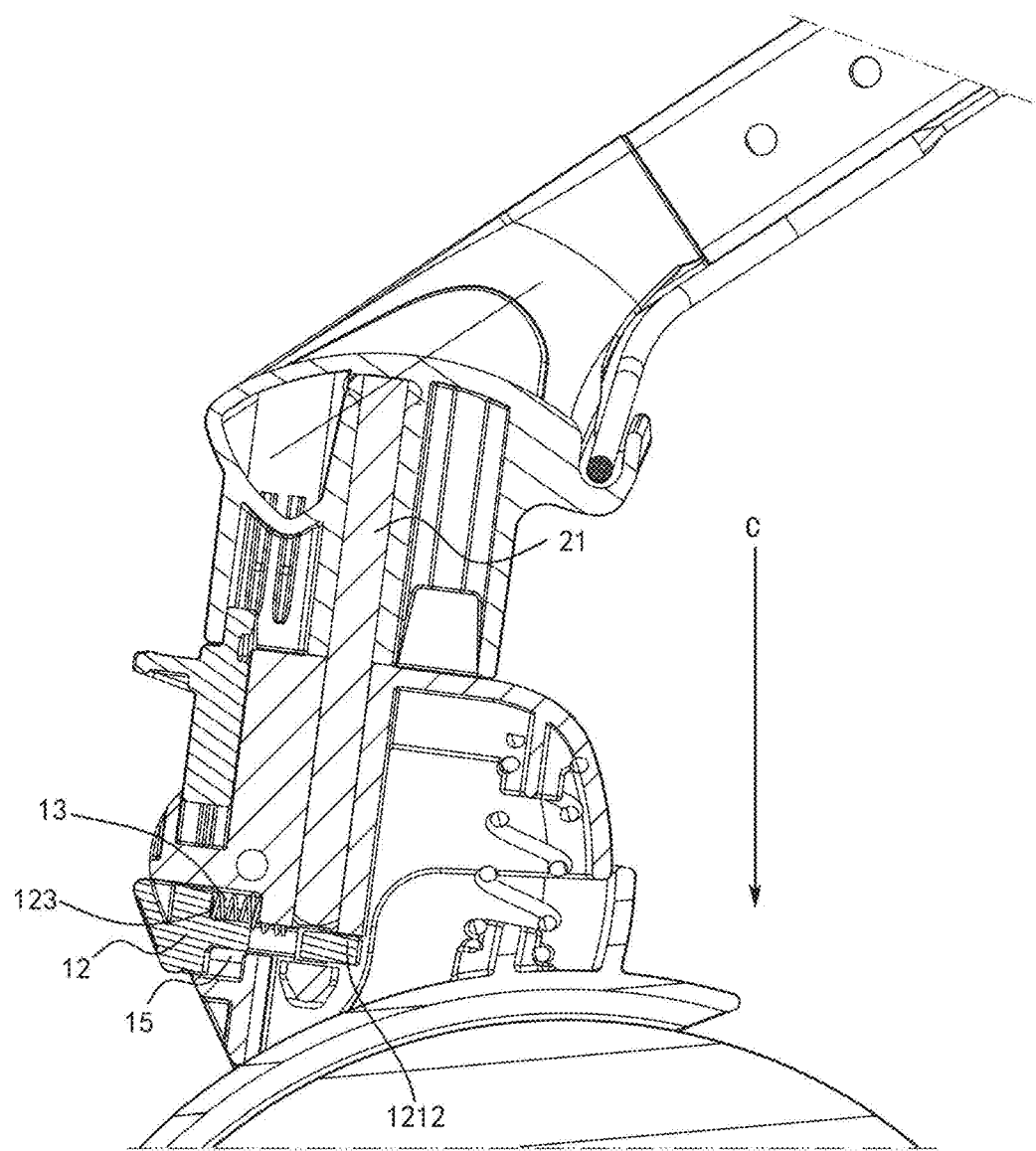
FIG. 4 shows a cross-sectional view of a wheel assembly and a part of a frame connected thereto according to an embodiment of the present disclosure.

FIG. 1 shows a perspective view of a wheel assembly and a part of a frame 2 connected thereto according to an embodiment of the present disclosure. FIG. 2 shows a perspective view of a wheel assembly according to an embodiment of the present disclosure. FIG. 3 shows a perspective view of a part of the frame 2 according to an embodiment of the present disclosure. FIG. 4 shows a cross-sectional view of a wheel assembly and a part of a frame 2 connected thereto according to an embodiment of the present disclosure.

Referring to FIGS. 1 to 4, various carriers with wheels usually have one or more wheel assemblies, that is, one or more wheel components. Each of the wheel assemblies may include a wheel seat 1 and a wheel 3. The wheel mechanism according to the present disclosure may include a wheel quick-release mechanism for detachably installing the wheel seat 1 of the wheel assembly onto a frame 2. The wheel seat 1 is provided with a receiving hole 11, an operating member 12, a spring 13, an inserting channel 15, and the like. The frame 2 is provided with adaptable connecting rods 21 and connecting portions 22, etc. In an embodiment, the connecting rod 21 protrudes from a center of the connecting portion 22.

Figure 6:
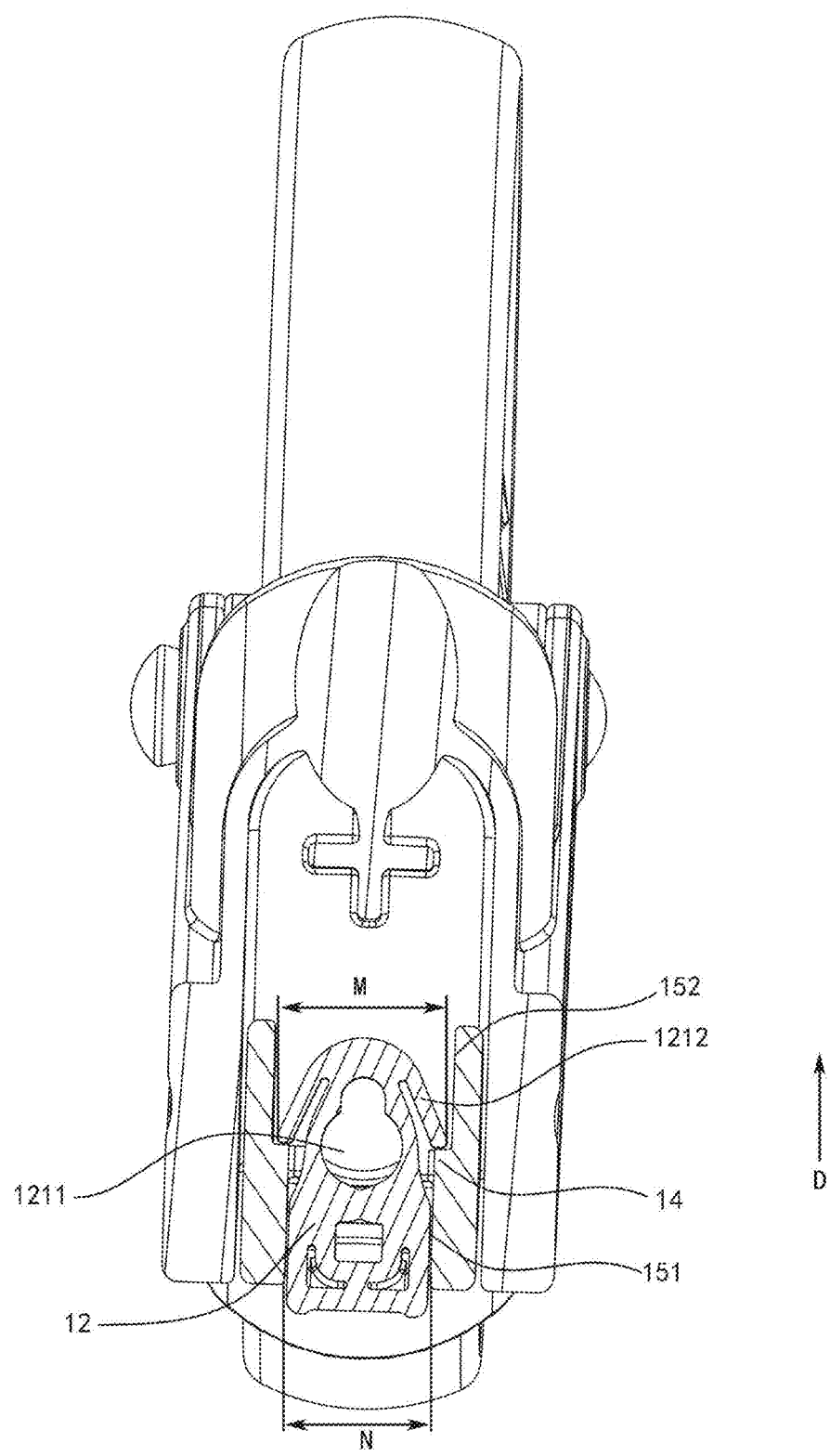
FIG. 6 shows a cross-sectional view of the wheel assembly taken along an inserting direction of the operating member according to an embodiment of the present disclosure.

The wheel quick-release mechanism according to an embodiment of the present disclosure may include a connecting rod 21 and a receiving hole 11. The connecting rod 21 is in a generally elongated cylinder shape. An end of the connecting rod is connected with the frame 2 and extends outward from a connecting portion 22 at the bottom of the frame, and the other end thereof forms a free end having a snapping portion 211. The receiving hole 11 is arranged in the wheel seat 1, and the connecting rod 21 can be received in the receiving hole 11 along an interposing direction C and can be snapped and positioned. The wheel quick-release mechanism may also include an inserting channel 15, an operating member 12 and a spring 13. The inserting channel 15 is arranged in the wheel seat 1 and communicated with the receiving hole 11. An extending direction of the inserting channel 15 may be perpendicular to an extending direction of the receiving hole 11. The operating member 12 may be inserted into the inserting channel 15 and further moves for a certain distance in the inserting channel 15 along an inserting direction D (as shown in FIG. 6) such that the user may assemble and disassemble the wheel assembly and the frame 2. The spring 13 acts between the operating member 12 and the wheel seat 1, and applies a pressure to the operating member 12, so as to keep the operating member 12 in a normal use state.

Figure 5:
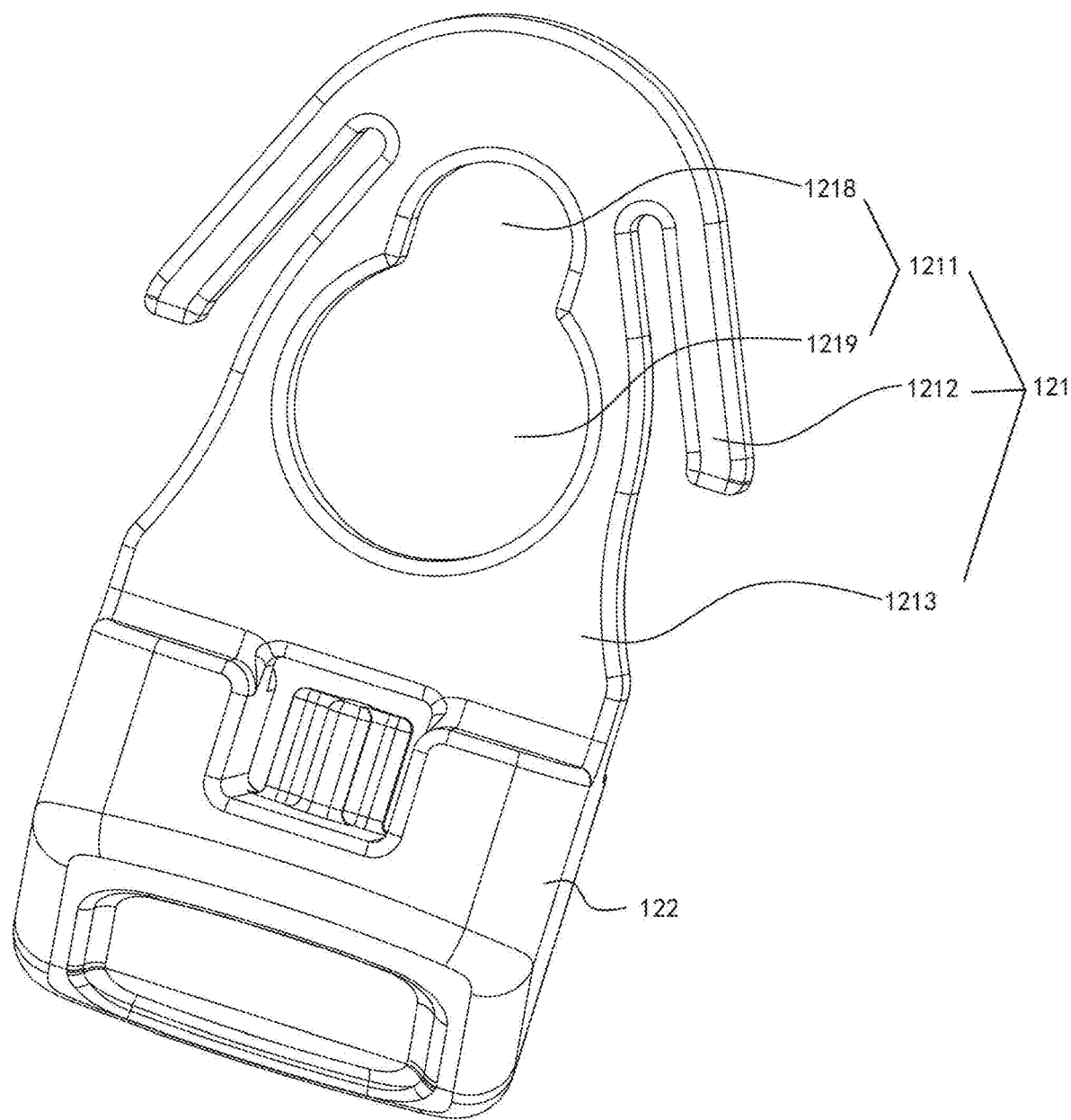
FIG. 5 shows a perspective view of an operating member according to an embodiment of the present disclosure.

FIG. 5 shows a perspective view of the operating member 12 according to an embodiment of the present disclosure. FIG. 6 shows a cross-sectional view of the wheel assembly taken along the inserting direction D of the operating member 12 according to an embodiment of the present disclosure.

Referring to FIGS. 4 to 6, the operating member 12 according to an embodiment of the present disclosure has a clamping portion 121 and an operating portion 122. The clamping portion 121 includes an operating hole 1211, an elastic abutting portion 1212, and a clamping portion body 1213 on which the operating hole 1211 and the elastic abutting portion 1212 are arranged. The connecting rod 21 may penetrate through the operating hole 1211 synchronously when it is received in the receiving hole 11. The elastic abutting portion 1212 may snap with and abut against the inserting channel 15. After the operation member 12 is assembled into the inserting channel 15, it may be in a locked position and a released position. In the normal use state, the operating member 12 is in the locked position. When the user applies a pushing force to the operating member 12 along the inserting direction D, the operating member 12 further enters the inserting channel 15 along the inserting direction D, and moves from the locked position to the released position. In the locked position, the operating member 12 restricts the connecting rod 21 from being disengaged from the receiving hole 11. In the released position, the operating member 12 allows the connecting rod 21 to be disengaged from the receiving hole 11, and at this time, the connecting rod 21 may be directly pulled out from the operating hole 1211.

Specifically, in an embodiment, the elastic abutting portion 1212 of the operating member 12 may be elastically deformed in a direction transverse to the inserting direction D of the operating member 12. In other words, under normal state (i.e., in a natural state), the elastic abutting portion 1212 has a transverse dimension M (i.e., the largest dimension in the transverse direction), and the transverse dimension M is larger than an inlet size N of the inserting channel 15. During assembly, when the operating member 12 is inserted into an inlet of the inserting channel 15 by an external force and the elastic abutting portion 1212 is elastically deformed, so that the transverse dimension of the elastic abutting portion 1212 becomes smaller until it is equal to or smaller than the inlet size N of the inserting channel 15, and thus the operating member 12 may be inserted into the inserting channel 15 smoothly. When the operating member 12 is inserted into an appropriate position of the inserting channel 15, an internal size of the inserting channel 15 is increased, thereby providing a space for the elastic abutting portion 1212 to elastically return (for example, return to an original state or still be pressed to a certain extent). At this time, since the present transverse dimension M of the elastic abutting portion 1212 is larger than the inlet size N of the inserting channel 15, the elastic abutting portion 1212 cannot reversely move away from the inserting channel 15, thereby avoiding the operating member 12 from being disengaged.

Referring to FIG. 5, the operating member 12 according to an embodiment of the present disclosure also has a clamping portion body 1213. The operating hole 1211 is arranged on the clamping portion body 1213, for example, at a central position of the clamping portion body 1213. The elastic abutting portion 1212 may be designed to extend from an outer edge of the clamping portion body 1213, so that the elastic abutting portion 1212 is elastically deformed when the operating member 12 enters the inlet of the inserting channel 15, and is elastically returned after the operating member 12 is inserted into an appropriate position of the inserting channel 15.

In an embodiment, the elastic abutting portion 1212 may be provided as an elastic finger, which obliquely extends from an inserting end of the clamping portion body 1213 or a position thereof near the inserting end in a direction opposite to the inserting direction D to form a branched arm, and is elastically deformed when the operating member 12 enters the inlet of the inserting channel 15, and is elastically returned after the operating member 12 is inserted into the appropriate position of the inserting channel 15.

In an embodiment, a plurality of elastic fingers may be provided, and are distributed circumferentially around the clamping portion body 1213, preferably distributed uniformly or symmetrically. In an embodiment, the plurality of elastic fingers are arranged such that the elastic fingers do not overlap with the operating hole 1211 when viewed along the interposing direction C, thereby avoiding interference of the elastic fingers with the connecting rod 21 penetrating through the operating hole 1211. In yet another embodiment, the plurality of elastic fingers are arranged in an interval, which is larger than the operating hole 1211, above and below the operating hole 1211 along the interposing direction C, such that the connecting rod 21 may penetrate into the operating hole 1211 without interference. In another embodiment, the plurality of elastic fingers are arranged such that a distance between their fingertips and the inserting end of the operating member 12 is not greater than a distance between a part of the operating hole 1211 closest to the inserting end and the inserting end, that is, when viewed along the interposing direction C, a fingertip edge of any of the elastic fingers does not overlap with the operating hole 1211, thereby facilitating the connecting rod 21 to penetrate through the operating hole 1211.

Of course, the present disclosure is not limited thereto. In another embodiment, as shown in FIGS. 4 to 6, the clamping portion body 1213 is in a shape of flat plate, the operating hole 1211 is positioned at a central position of the clamping portion body 1213, and two elastic fingers 1212 are provided. The two elastic fingers 1212 respectively extend from opposite sides of the clamping portion body 1213 transverse to the inserting direction D and obliquely extend to form branched arms. In this case, a transverse dimension M of the elastic abutting portion 1212 refers to the maximum dimension of the elastic fingers 1212 on both sides of the flat plate-shaped clamping portion body 1213 in a direction transverse to the inserting direction D. Similarly, an inlet size N of the inserting channel 15 refers to a dimension of an inlet of the inserting channel 15 in the direction transverse to the inserting direction D.

In yet another embodiment, the elastic abutting portion 1212 is provided as an elastic skirt (not shown), and the elastic skirt obliquely extends from the inserting end of the clamping portion body 1213 or a position thereof near the inserting end in the direction opposite to the inserting direction D to form a mushroom shape or a partial mushroom shape. The elastic skirt is elastically deformed when the operating member 12 enters the inlet of the inserting channel 15, and is elastically returned after the operating member 12 is inserted into the appropriate position of the inserting channel 15. In this case, the transverse dimension M of the elastic abutting portion 1212 refers to a diameter of the largest circular cross section of the mushroom-shaped elastic skirt in the direction transverse to the inserting direction D, and the inlet size N of the inserting channel 15 refers to the dimension of the inlet of the inserting channel 15 in the direction transverse to the inserting direction D.

In an embodiment, the elastic skirt is arranged such that the elastic skirt does not overlap with the operating hole 1211 when viewed along the interposing direction C, so as to avoid interference of the elastic skirt with the connecting rod 21 penetrating through the operating hole 1211. For example, the elastic skirt may be arranged such that a distance between its skirt edge and the inserting end of the operating member 12 is not greater than a distance between the part of the operating hole 1211 closest to the inserting end and the inserting end. In yet another embodiment, a side of the elastic skirt facing the connecting rod 21 forms an opening for the connecting rod 21 to freely pass through.

As shown in FIG. 5, the operating member 12 has an integrally formed clamping portion 121 and an operating portion 122 for inserting operation, and both the operating hole 1211 and the elastic abutting portion 1212 are arranged on the clamping portion 121. As shown in FIG. 4, an end of the spring 13 is installed on the operating portion 122, and the other end of the spring 13 is installed at the corresponding position of the wheel seat 1. The spring 13 is configured to apply an elastic force to the operating member 12 to keep the operating member 12 in a locked position. As shown in FIG. 4, the spring 13 may exert a pressure to push the operating member 12 outward.

Of course, the operating member 12 of the present disclosure is not limited thereto. The clamping portion 121 and the operating portion 122 for inserting operation may also be connected by welding, bonding or any other suitable way. In addition, the operating member may be a plastic material, a metal material or any other suitable material.

In an embodiment, the operating hole 1211 is in a gourd shape with a large hole portion 1219 and a small hole portion 1218 that communicates with each other. The shapes and sizes of the large hole portion 1219 and the small hole portion 1218 are provided to match with the shape and size of the snapping portion 211 of the connecting rod 21, so that when the connecting rod 21 is received in the interposing direction C of the receiving hole 11, the snapping portion 211 of the connecting rod 21 may pass through the large hole portion 1219, but cannot pass through the small hole portion 1218. Also, the connecting rod 21 may move between the large hole portion 1219 and the small hole portion 1218 in the direction transverse to the interposing direction C. Of course, the shape of the operating hole is not limited thereto, and the large hole portion may be in any suitable shape, such as square, triangle, hexagon or the like, and the small hole portion may be in any shape suitable for matching with the snapping portion 211.

In an embodiment, as shown in FIG. 3, the snapping portion 211 includes a tail head portion 2112 and a fixing recess portion 2111. The tail head portion 2112 is formed at a tail end of the connecting rod 21. The fixing recess portion 2111 is provided at a side of the tail head portion 2112 away from the tail end, and is formed in a shape of groove that is recessed inward in the entire circumference. In the locked position, the fixing recess portion 2111 is aligned and matched with the small hole portion 1218, and is snapped with the small hole portion 1218 of the operating hole 1211 via the tail head portion 2112. In the released position, the fixing recess portion 2111 is aligned with the large hole portion 1219, and the tail head portion 2112 may pass through the large hole portion 1219.

Referring to FIG. 6, in an embodiment, the inserting channel 15 may include a small-sized channel portion 151 and a large-sized channel portion 152, with a blocking portion 14 transitioning therebetween. The small-sized channel portion 151 is close to the inlet of the inserting channel 15, and the large-sized channel portion 152 is far away from the inlet of the inserting channel 15. The inlet size N of the inserting channel 15 is a size of the small-sized channel portion 151. During the assembly of the wheel seat, when the operating member 12 enters the small-sized channel portion 151 of the inserting channel 15 by an external force and the elastic abutting portion 1212 is elastically deformed, the operating member 12 is inserted into the small-sized channel portion 151; and when the operating member 12 is inserted into the large-size channel portion 152, the elastic abutting portion 1212 is elastically returned. Under normal state, the operating member 12 is in the locked position, and as shown in FIG. 6, the elastic abutting portion 1212 abuts against the blocking portion 14 to restrict the connecting rod 21 from being disengaged from the receiving hole 11. In the released position, the elastic abutting portion 1212 no longer abuts against the blocking portion 14, and the operating hole 1211 allows the connecting rod 21 to be disengaged from the receiving hole 11.

As shown in FIG. 4, the operating member 12 also includes a step portion 123. The step portion 123 is formed between the clamping portion 121 and the operating portion 122. The spring 13 is positioned between the step portion 123 and the corresponding position of the wheel seat. When an external force along the inserting direction D is applied to the operating member 12 so that the operating member 12 is in the released position, the spring 13 contracts; and when the operating member 12 is released, a contraction force of the spring forces the operating member 12 to return back to the locked position.

With the wheel quick-release structure of the present disclosure, the user may disengage the connecting rod 21 from the receiving hole 11 by pushing the operating member 12, and take out the connecting rod 21 from the wheel seat 1, so that the wheel seat 1 may be detached from the frame 2 simply, quickly and conveniently. On the contrary, the user may insert the connecting rod 21 into the receiving hole 11 of the wheel seat 1 and simultaneously push the operating member 12, so that the connecting rod 21 may easily penetrate into the operating hole 1211, and then the user may release the operating member 12. In such a way, the wheel seat 1 is simply, quickly and conveniently installed onto the frame 2. Thus, the wheel quick-release structure of the present disclosure may be easily operated by one person, and even by users with less strength (such as mothers of the children) the disassembly and assembly of the wheel seat may also be easily completed.

With the wheel quick-release structure of the present disclosure, when the user takes out the connecting rod 21 from the wheel seat 1, the operating member 12 is forced to return to the locked position due to the contraction force of the spring, and the elastic abutting portion 1212 is snapped with the blocking portion 14, so that the operating member 12 will not be further disengaged from the inserting channel 15, thus avoiding the scattering or even loss of parts.

With the wheel quick-release structure of the present disclosure, during the assembly of the wheel seat, the operator or the user may easily make the elastic abutting portion 1212 to elastically deform by an external force, thereby simply inserting the operating member 12 into the inserting channel 15. The wheel quick-release structure has a simple design, is convenient to manufacture and assemble, and is beneficial to improve production efficiency and reduce manufacturing cost.

The present disclosure also provides a wheel assembly including a wheel quick-release mechanism as described above, a wheel seat 1 and a wheel, wherein the wheel is rotatably installed on the wheel seat 1. In an embodiment, the wheel may be a front wheel.

The present disclosure also provides a child carrier including a frame 2 and at least one wheel assembly as described above. The child carrier may be a stroller, a baby carriage, a crib on wheels, or the like.

Figure 7:
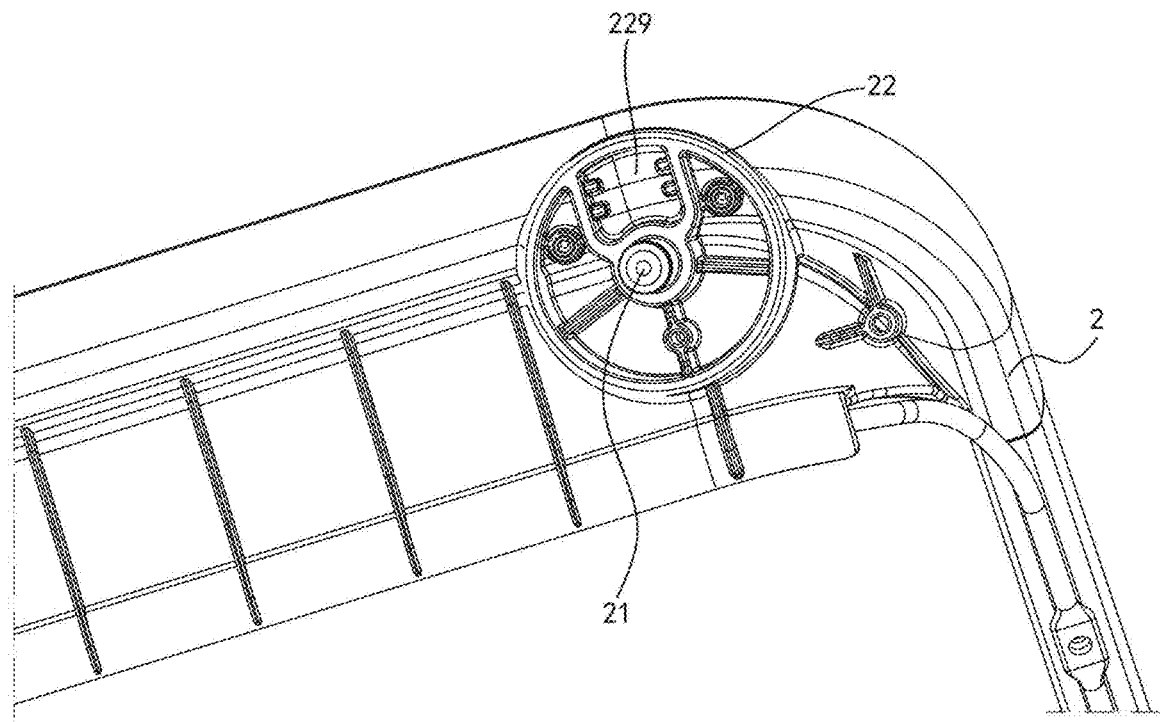
FIG. 7 shows a bottom perspective view of a part of a frame according to an embodiment of the present disclosure.
Figure 8:
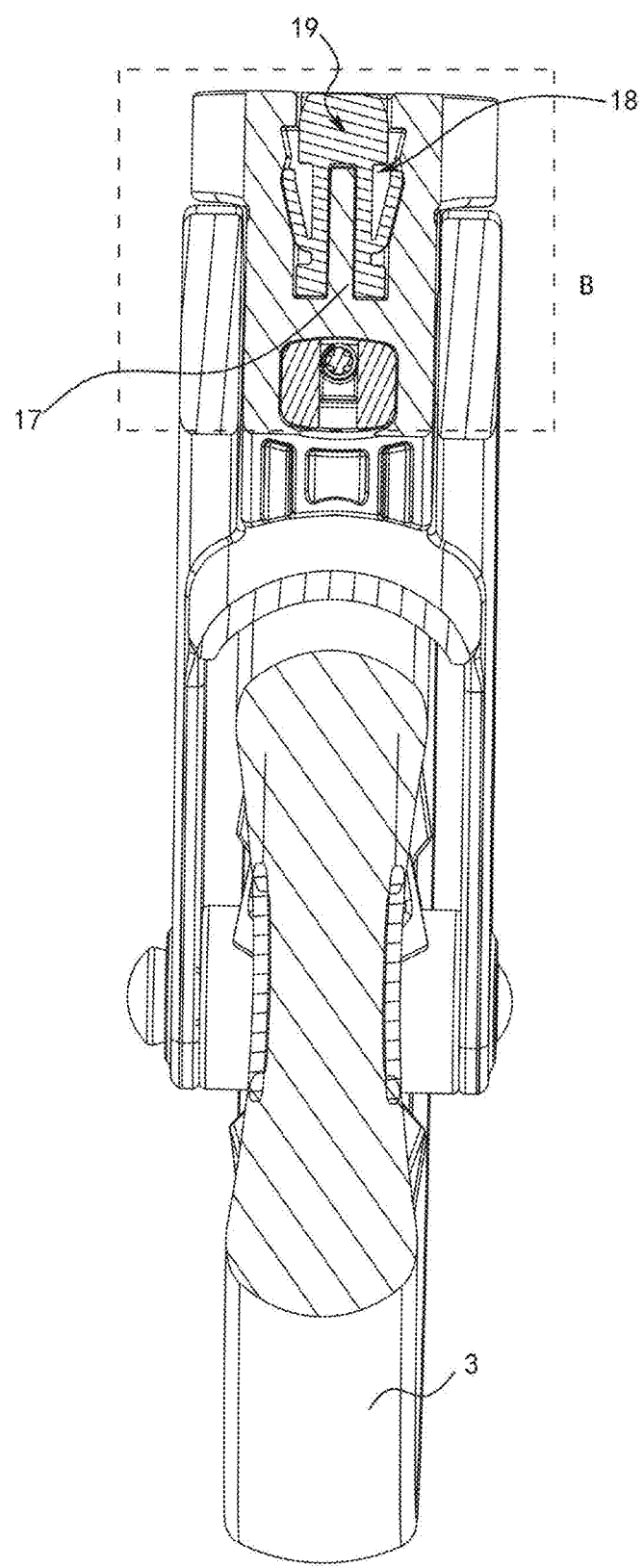
FIG. 8 shows a cross-sectional view of the wheel assembly taken along a plugging direction of an oriented-locking element according to an embodiment of the present disclosure, in which the oriented-locking element is in a released position.

FIG. 7 shows a bottom perspective view of a part of the frame 2 according to an embodiment of the present disclosure. FIG. 8 shows a cross-sectional view of the wheel assembly taken along a plugging direction of an oriented-locking element 19 according to an embodiment of the present disclosure, in which the oriented-locking element 19 is in a released position.

Referring to FIGS. 1-2 and 7-8, the wheel assembly includes a wheel seat 1 and a wheel 3. The wheel mechanism according to the present disclosure may include a wheel orientation mechanism for orienting the wheel seat 1 with respect to the frame 2. The wheel seat 1 is provided with a receiving slot 18, an oriented-locking element 19, a guide rod 17 and the like. The frame 2 is provided with an orientating portion 229. In an embodiment, the orientating portion 229 is a recess arranged in a connecting portion 22 of the frame 2.

The wheel orientation mechanism according to an embodiment of the present disclosure includes an orientating portion 229 arranged on the frame 2; a receiving slot 18 arranged in the wheel seat 1 corresponding to the orientating portion 229; and an oriented-locking element 19 which is interposed into the receiving slot 18 and may be simultaneously inserted into the orientating portions 229 by operation.

Figure 9:
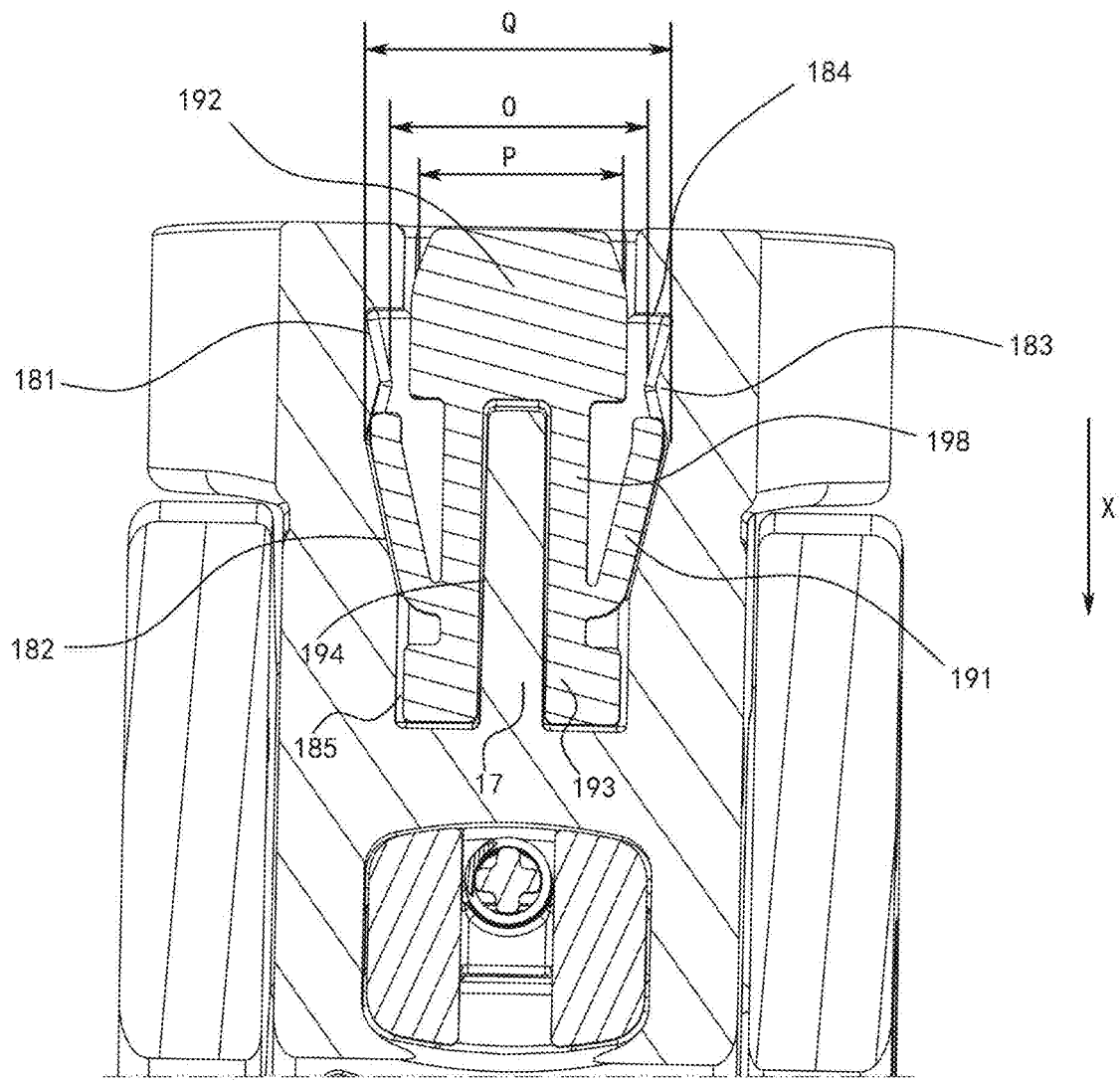
FIG. 9 shows an enlarged view of part B in FIG. 8.
Figure 10:
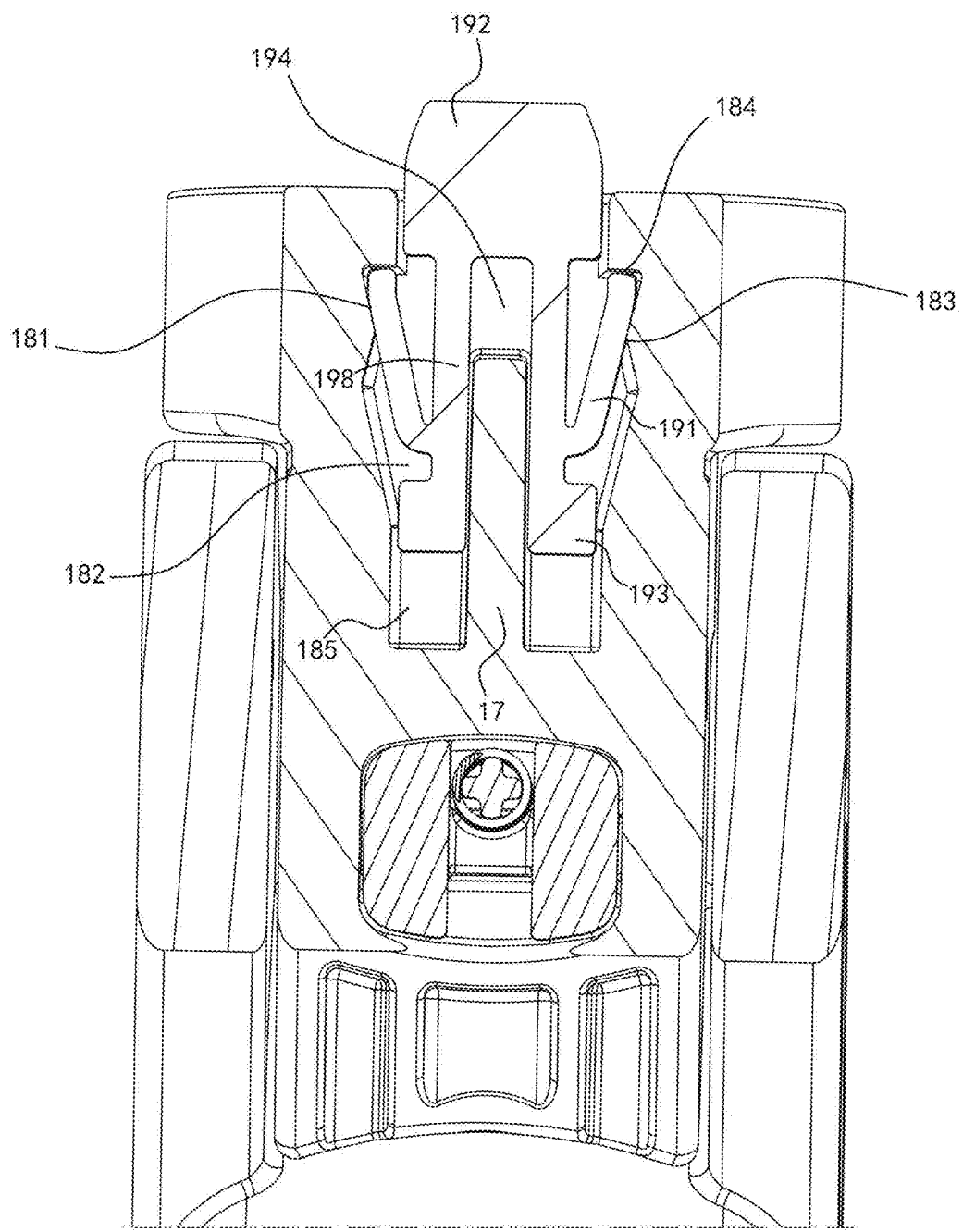
FIG. 10 shows an enlarged cross-sectional view of the wheel assembly taken along a plugging direction of an oriented-locking element according to an embodiment of the present disclosure, in which the oriented-locking element is in a locked position.

FIG. 9 shows an enlarged view of part B in FIG. 8, in which the oriented-locking element 19 shown in FIG. 8 is in the released position. FIG. 10 shows an enlarged cross-sectional view of the wheel assembly taken along an interposing direction of an oriented-locking element 19 according to an embodiment of the present disclosure, in which the oriented-locking element 19 is in a locked position.

Referring to FIGS. 7 to 10, the oriented-locking element 19 according to an embodiment of the present disclosure includes an elastic stopping portion 191 and an engaging end 192. The oriented-locking element 19 also includes a handle exposed outside for the user to pull or press, so as to control movement of the oriented-locking element 19. When the user applies an external force to pull or press the oriented-locking element 19, the oriented-locking element 19 may slide between the released position and the locked position relative to the orientating portion 229 under the external force. As shown in FIG. 9, in the locked position, the engaging end 192 of the oriented-locking element 19 protrudes from the opening of the receiving slot 18 and is inserted into the orientating portion 229. As shown in FIG. 10, in the released position, the engaging end 192 of the oriented-locking element 19 is retracted into the receiving slot 18 and is not inserted into the orientating portion 229.

In an embodiment, the oriented-locking element 19 may be elastically deformed in a direction transverse to its plugging direction X. Specifically, in a normal state, the oriented-locking element 19 has a transverse dimension (i.e., the largest dimension in the transverse direction) Q, which is larger than an inlet size P of the receiving slot 18. During the assembly of the wheel seat, when the oriented-locking element 19 enters an inlet of the receiving slot 18 by external force and the oriented-locking element 19 may be elastically deformed, the transverse dimension of the oriented-locking element 19 may be reduced until it is equal to or smaller than the inlet size P of the receiving slot 18, and thus the oriented-locking element 19 may be smoothly inserted into the receiving slot 18; and when the oriented-locking element 19 is inserted into an appropriate position of the receiving slot 18, the oriented-locking element 19 is elastically returned (for example, returned to an original state or is still pressed to a certain extent), and cannot be disengaged from the receiving slot 18.

Referring to FIGS. 9 and 10, the receiving slot 18 has a locking slot 181 near the inlet and a release slot 182 far away from the inlet. Furthermore, there is a locking protrusion 183 protruding inward between the locking slot 181 and the release slot 182. The opening size O formed by the locking protrusion 183 is smaller than the transverse dimension Q of the oriented-locking element 19 in the normal state. In the released position, the elastic stopping portion 191 is in the release slot 182; and in the locked position, the elastic stopping portion 191 is in the locking slot 181.

In an embodiment, both sides of a top end of the locking protrusion 183 are side walls that smoothly incline outwards, respectively, so that the elastic stopping portion 191 may move between the release slot 182 and the locking slot 181 relatively smoothly across the locking protrusion 183 under the action of an external force, so as to be stopped in the locking slot 181 or the release slot 182. In an embodiment, the locking protrusion 183 may be an inwardly-protruding triangular protrusion. Of course, the present disclosure is not limited thereto. The locking protrusion 183 may also have any other suitable shape, for example, both sides of the top end of the locking protrusion 183 may be smooth arc-shaped convex side walls, and for another example, a plurality of tiny steps, protrusions or teeth may be formed on the side walls so as to provide the user with a feeling of movement during operation.

In an embodiment, a part of the locking slot 181 that is in contact with the inlet of the receiving slot 18 has a transverse dimension that is larger than the inlet size P of the receiving slot 18. For example, a stepped portion 184 is provided at a junction part of the locking slot 181 and the inlet of the receiving slot 18. When the oriented-locking element 19 reaches the locked position under the action of the external force, the step portion 184 blocks the elastic stopping portion 191, thereby preventing the oriented-locking element 19 from being further removed out from the inlet of the receiving slot 18. At this time, the elastic stopping portion 191 is in the locking slot 181, and may be stopped in the locking slot 181 in a pose of a certain degree of deformation by a force exerted by the side wall of the locking protrusion 183 near the locking slot 181. The force inclines upwards to counteract the gravity of the oriented-locking element 19 itself, so that the oriented-locking element 19 is firmly stopped in the locked position, thereby avoiding position failure.

In an embodiment, the oriented-locking element 19 also includes a sliding portion 193. The elastic stopping portion 191 is positioned between the engaging end 192 and the sliding portion 193. The locking slot 181 has a guide portion 185, and the guide portion is provided at an end of the locking slot 181 opposite to the inlet. When the elastic stopping portion 191 moves between the release slot 182 and the locking slot 181, the sliding portion 193 slides on the guide portion 185.

In an embodiment, the receiving slot 18 is also provided with a guide rod 17. The guide rod 17 extends from a bottom center of the receiving slot 18 towards the inlet and forms an annular space with the inner wall of the receiving slot 18. The guide rod 17 may have a cylindrical, flat, or any other suitable cross section.

In an embodiment, the oriented-locking element 19 has a guide hole 194, and the guide hole 194 is arranged in a center of an interposing end of the oriented-locking element. The interposing end of the oriented-locking element 19 is an end opposite to its engaging end 192. When the oriented-locking element 19 is interposed into the locking slot 181, the guide rod 17 penetrates into the guide hole 194. The guide hole 194 is provided to have a shape matching with that of the guide rod 17 to guide the sliding of the guide rod 17. The cross section of the guide hole 194 may be cylindrical, flat, or in any other suitable shape, for example.

In an embodiment, the oriented-locking element 19 also includes an oriented-locking element body 198. The elastic stopping portion 191 extends out of the oriented-locking element body 198, so that the elastic stopping portion 191 is elastically deformed when the oriented-locking element 19 enters the inlet of the receiving slot 18, and may be elastically returned when the oriented-locking element 19 is inserted into an appropriate position of the receiving slot 18.

In an embodiment, the elastic stopping portion 191 is provided as a finger, and the finger obliquely extends from the interposing end of the oriented-locking element body 198 or a position thereof near the interposing end in a direction opposite to the plugging direction, to form a branched arm. The elastic finger is elastically deformed when the oriented-locking element 19 enters the inlet of the receiving slot 18, and is elastically returned after the oriented-locking element 19 is inserted into the appropriate position of the receiving slot 18.

In an embodiment, a plurality of fingers are provided, and the plurality of fingers are distributed circumferentially around the oriented-locking element body 198, preferably distributed uniformly or symmetrically. Of course, the present disclosure is not limited thereto. In another embodiment, as shown in FIGS. 9 and 10, two fingers may be provided, and the oriented-locking element body 198 is in a shape of flat plate or cylindrical rod, and the two fingers respectively extend from two opposite sides of the oriented-locking element body 198 transverse to the plugging direction X.

In yet another embodiment, the elastic stopping portion 191 is provided as a skirt (not shown). The skirt obliquely extends from the interposing end of the oriented-locking element body 198 or a position thereof near the interposing end in the direction opposite to the plugging direction to form in a mushroom shape, and the skirt is elastically deformed when the oriented-locking element 19 enters the inlet of the receiving slot 18, and is elastically returned after the oriented-locking element 19 is inserted into the appropriate position of the receiving slot 18.

With the wheel orientation structure of the present disclosure, the user may pull the oriented-locking element 19, so that the engaging end 192 of the oriented-locking element 19 protrudes from the opening of the receiving slot 18 and is inserted into the orientating portion 229. At this time, the elastic stopping portion 191 is positioned in the locking slot 181 and is subjected to a force exerted by the side wall of the locking protrusion 183 near the locking slot 181, so that the elastic stopping portion 191 is stopped in the locking slot 181 in a pose of a certain degree of deformation. That is, the engaging end 192 of the oriented-locking element 19 is held in the orientating portion 229, and the oriented-locking element 19 is held in the receiving slot 18 at the same time, so as to realize the orientation of the wheel seat 1 relative to the frame 2. Conversely, the user may pull or press the oriented-locking element 19 in an opposite direction, so that the oriented-locking element 19 completely enters the receiving slot 18. At this time, the engaging end 192 of the oriented-locking element 19 is retracted into the receiving slot 18 without being inserted into the orientating portion 229, thereby cancelling the orientation. Briefly, with the wheel orientation structure of the present disclosure, the user can simply, quickly and conveniently realize or cancel the wheel orientation.

With the wheel orientation structure of the present disclosure, during the assembly of the wheel seat, the operator or the user may easily make the elastic stopping portion 191 to elastically deform by an external force, thereby simply inserting the oriented-locking element 19 into the locking slot 18. The wheel orientation structure has a simple design, is convenient to manufacture and assemble, and is beneficial to improve production efficiency and reduce manufacturing cost.

The present disclosure also provides a wheel assembly including a wheel orientation mechanism as described above, a wheel seat 1 and a wheel, wherein the wheel is rotatably installed on the wheel seat 1. In an embodiment, the wheel may be a front wheel.

The present disclosure also provides a child carrier including a frame 2 and at least one wheel assembly as described above. The child carrier may be a stroller, a baby carriage, a crib on wheels, or the like.

The wheel mechanism of the present disclosure may include only the wheel quick-release mechanism as described above, or only the wheel orientation mechanism as described above, or both the wheel quick-release mechanism and the wheel orientation mechanism as described above.

Although relative terms such as "above" and "under" are used herein to describe the relationship of one component relative to another component, such terms are used herein only for the sake of convenience, for example, in the direction shown in the figure, it should be understood that if the referenced device is inversed upside down, a component described as "above" will become a component described as "under". When a structure is described as "above" another structure, it probably means that the structure is integrally formed on another structure, or, the structure is "directly" disposed on another structure, or, the structure is "indirectly" disposed on another structure through an additional structure.

In this specification, the terms "a", "an", "the", "said" and "at least one", are used to express the presence of one or more the element/constitute/or the like. The terms "comprise", "include" and "have" are intended to be inclusive, and mean there may be additional elements/constituents/or the like other than the listed elements/constituents/or the like. The "first", "second" and "third" are used only as marks, and are not numerical restriction to the objects.

Unless otherwise defined, all terms used herein, including technical and scientific terms, have the same meanings as commonly understood by the ordinary skilled in the field to which the present disclosure belongs. It should also be understood that terms should be interpreted as having meanings consistent with their meanings in the context of related fields, and will not be interpreted as idealized or overly formal meanings unless explicitly defined herein.

It should be understood that although the preferred embodiments are shown and described above, the present disclosure is not limited to the specific embodiments described above, and various modifications and variations can be made by those skilled in the art without departing from the spirit and scope of the appended claims. Therefore, it should be noted that various modifications and variations cannot be considered beyond the technical spirit and scope of the present disclosure.

What is claimed is:

1. A wheel mechanism comprising a wheel quick-release mechanism for detachably installing a wheel seat onto a frame, the wheel quick-release mechanism comprising:
   a connecting rod having an end connected with the frame and the other end provided with a snapping portion;
   a receiving hole arranged in the wheel seat for receiving the connecting rod;
   an inserting channel arranged in the wheel seat and communicated with the receiving hole; and
   an operating member movably arranged in the inserting channel and having a clamping portion and an operating portion, wherein the clamping portion has an operating hole and an elastic abutting portion, wherein the connecting rod penetrates through the operating hole synchronously when received in the receiving hole, and the elastic abutting portion is capable of snapping with and abutting against the inserting channel, the operating member has a locked position in a normal state and a released position in a state under an external force, and in the locked position, the operating member restricts the connecting rod from being disengaged from the receiving hole; and in the released position, the operating member allows the connecting rod to be disengaged from the receiving hole; and a spring acting between the operating member and the wheel seat, and applying an elastic force on the operating member to keep the operating member in the locked position, wherein the elastic abutting portion of the operating member is elastically deformed in a direction transverse to an inserting direction of the operating member, and has a transverse dimension larger than an inlet size of the inserting channel in the normal state, so that the elastic abutting portion is elastically deformed when the operating member enters an inlet of the inserting channel, and is elastically returned when the operating member is inserted into an appropriate position of the inserting channel, and cannot be disengaged from the inserting channel, and wherein a step portion is formed between the clamping portion and the operating portion, the spring is positioned between the step portion and a corresponding position of the wheel seat, the step portion is provided with a notch recessed towards a side away from the clamping portion, and the spring is at least partially accommodated in the notch.

2. The wheel mechanism of claim 1, wherein the clamping portion further has a clamping portion body, and the elastic abutting portion extends from the clamping portion body, so that the elastic abutting portion is elastically deformed when the operating member enters the inlet of the inserting channel, and is elastically returned after the operating member is inserted into the appropriate position of the inserting channel.

3. The wheel mechanism of claim 2, wherein the elastic abutting portion is provided as an elastic finger, and the elastic finger obliquely extends from an inserting end of the clamping portion body or a position of the clamping portion body near the inserting end in a direction opposite to the inserting direction to form a branched arm, and is elastically deformed when the operating member enters the inlet of the inserting channel, and is elastically returned after the operating member is inserted into the appropriate position of the inserting channel.

4. The wheel mechanism of claim 3, wherein a plurality of elastic fingers are provided, and are distributed on the clamping portion body.

5. The wheel mechanism of claim 3, wherein two elastic fingers are provided, the clamping portion body is in a shape of flat plate, the operating hole is positioned at a central position of the clamping portion body, and the two elastic fingers respectively extend from opposite sides of the clamping portion body with respect to the inserting direction.

6. The wheel mechanism of claim 2, wherein the elastic abutting portion is provided as an elastic skirt, and the elastic skirt obliquely extends from an inserting end of the clamping portion body or a position of the clamping portion body near the inserting end in a direction opposite to the inserting direction to form a mushroom shape, the elastic skirt is elastically deformed when the operating member enters the inlet of the inserting channel, and is elastically returned after the operating member is inserted into the appropriate position of the inserting channel.

7. The wheel mechanism of claim 1, wherein the operating member has an integrally formed clamping portion and an operating portion for inserting operation, the operating hole and the elastic abutting portion are arranged on the clamping portion, an end of the spring is installed on the operating portion, and the other end of the spring is installed at a corresponding position of the wheel seat.

8. The wheel mechanism of claim 1, wherein the operating hole is in a gourd shape with a large hole portion and a small hole portion that communicates with each other;

shapes and sizes of the large hole portion and the small hole portion are provided to match with a shape and size of the snapping portion of the connecting rod, so that when the connecting rod is received in an interposing direction of the receiving hole, the snapping portion of the connecting rod enables to pass through the large hole portion, but cannot pass through the small hole portion, and the connecting rod enables to move between the large hole portion and the small hole portion in a direction transverse to the interposing direction.

9. The wheel mechanism of claim 8, wherein the snapping portion comprises a tail head portion formed at a tail end of the connecting rod, and a fixing recess portion provided at a side of the tail head portion away from the tail end, and is formed as a groove that is recessed inward in an entire circumference;

in the locked position, the fixing recess portion is aligned with the small hole portion, and is snapped with the small hole portion of the operating hole via the tail head portion; and in the released position, the fixing recess portion is aligned with the large hole portion, and the tail head portion enables to pass through the large hole portion.

10. The wheel mechanism of claim 7, wherein when an external force along the inserting direction is applied to the operating member so that the operating member is in the released position, the spring contracts; and when the operating member is released, a contraction force of the spring forces the operating member to return to the locked position.

11. A wheel assembly comprising a wheel mechanism of claim 1, the wheel seat and a wheel, the wheel being rotatably installed on the wheel seat.

12. The wheel assembly of claim 11, wherein the wheel is a front wheel.

13. A child carrier, comprising the frame and the wheel assembly of claim 11.

* * * * *